US006351761B1

(12) United States Patent
Cantone et al.

(10) Patent No.: US 6,351,761 B1
(45) Date of Patent: Feb. 26, 2002

(54) INFORMATION STREAM MANAGEMENT PUSH-PULL BASED SERVER FOR GATHERING AND DISTRIBUTING ARTICLES AND MESSAGES SPECIFIED BY THE USER

(75) Inventors: Michael Robert Cantone, Wheeling, IL (US); Mark Alan Jones, New Providence; Lawrence Patrick O'Gorman, Madison, both of NJ (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/216,023

(22) Filed: Dec. 18, 1998

(51) Int. Cl.[7] .............................. G06F 9/00; G06F 17/30
(52) U.S. Cl. ...................... 709/202; 709/217; 709/219; 709/201; 707/2; 707/10
(58) Field of Search ................................. 709/202, 102, 709/201, 203, 206, 217, 218, 223, 224, 225, 229, 219; 370/312, 901; 707/10, 522, 104.1, 501.1, 2

(56) References Cited

U.S. PATENT DOCUMENTS

| | | | |
|---|---|---|---|
| 4,713,806 A | 12/1987 | Oberlander et al. | 370/358 |
| 4,720,850 A | 1/1988 | Oberlander et al. | 379/90.01 |
| 5,438,568 A | 8/1995 | Weisser, Jr. | 370/389 |
| 5,555,376 A | 9/1996 | Theimer et al. | 709/229 |
| 5,557,320 A | 9/1996 | Krebs | 725/114 |
| 5,557,798 A | 9/1996 | Skeen et al. | 705/35 |
| 5,590,360 A | 12/1996 | Edwards | 709/102 |
| 5,608,907 A | 3/1997 | Fehskens et al. | 709/102 |
| 5,611,050 A | 3/1997 | Theimer et al. | 709/202 |
| 5,617,568 A | 4/1997 | Ault et al. | 707/101 |
| 5,742,763 A | 4/1998 | Jones | 709/317 |
| 5,802,510 A | 9/1998 | Jones | 707/2 |
| 5,862,325 A * | 1/1999 | Reed et al. | 709/201 |
| 6,044,205 A * | 3/2000 | Reed et al. | 709/201 |

* cited by examiner

Primary Examiner—Mehmet B. Geckil
Assistant Examiner—Beatriz Prieto
(74) Attorney, Agent, or Firm—Joseph C. Redmond, Jr.; Morgan & Finnegan, LLP

(57) ABSTRACT

An information stream management network server is disclosed that enables distributing articles to a destination in the network at times and in forms that are specified by a user, while also enabling accessing and receiving the articles from sources in the network at times and in forms that are independent of the user. The network server handles both information pull articles and information push articles. The information push articles use declarative addressing to specified groups of users, thereby masking recipient end-point identities and delivery preferences from sources and enabling broadcast communication to members of such a group.

53 Claims, 12 Drawing Sheets

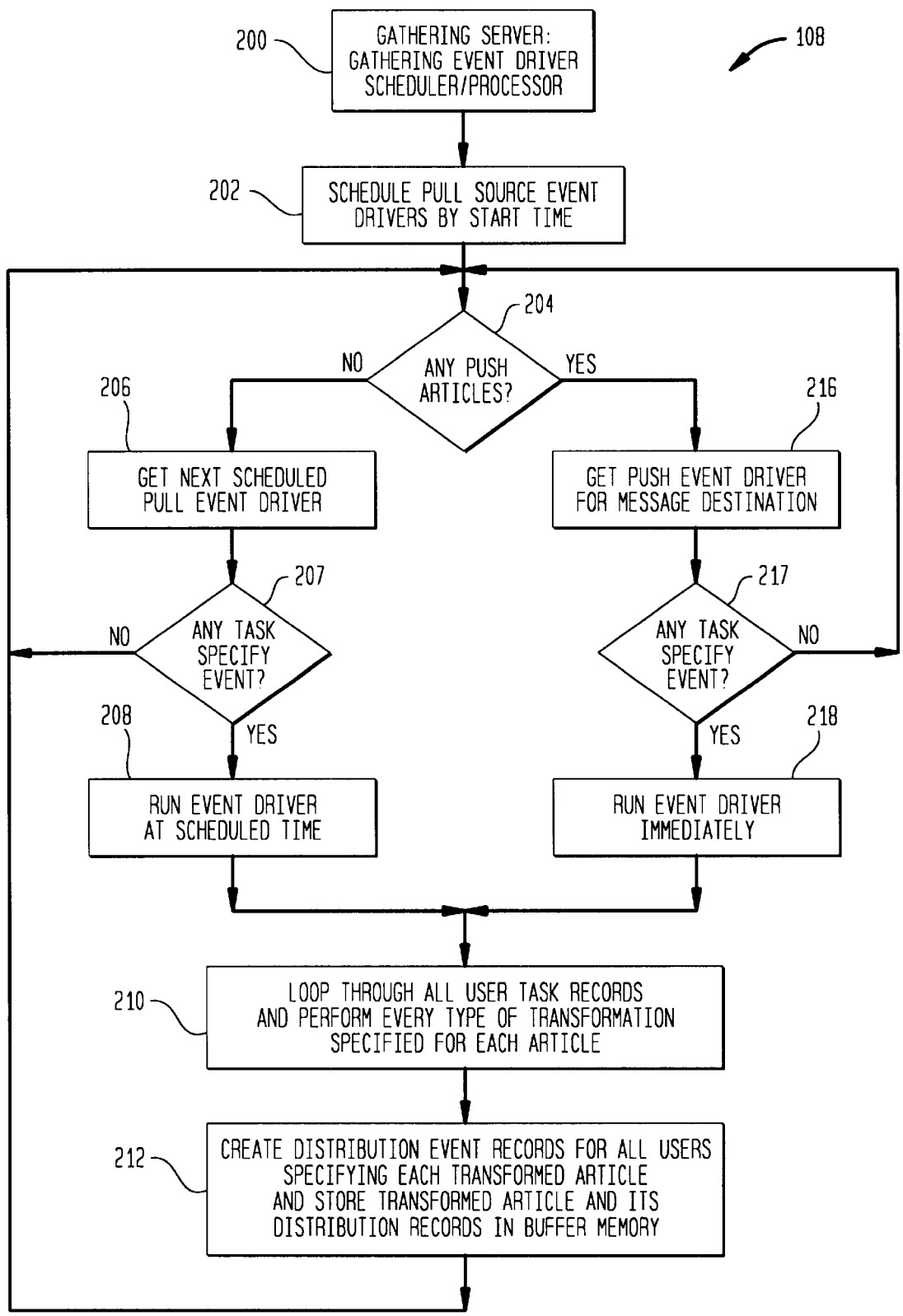

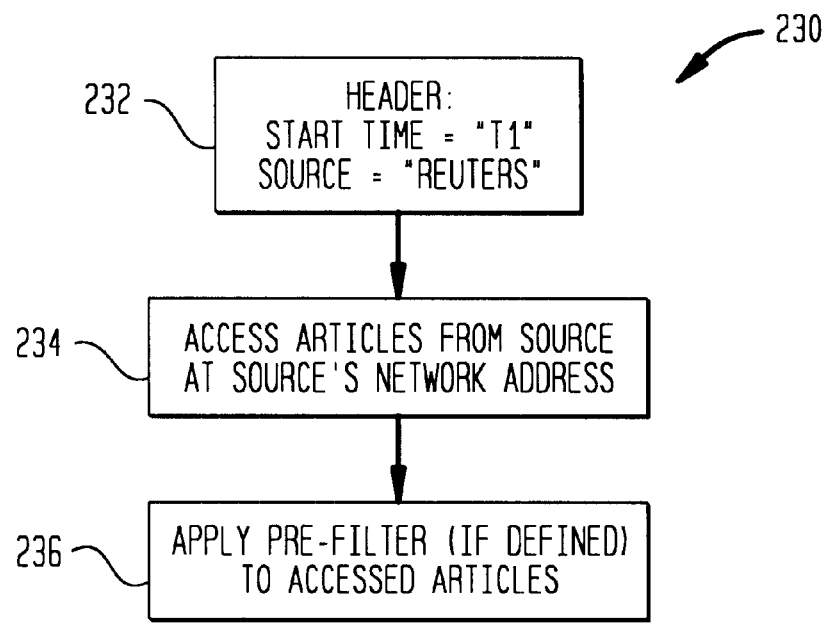
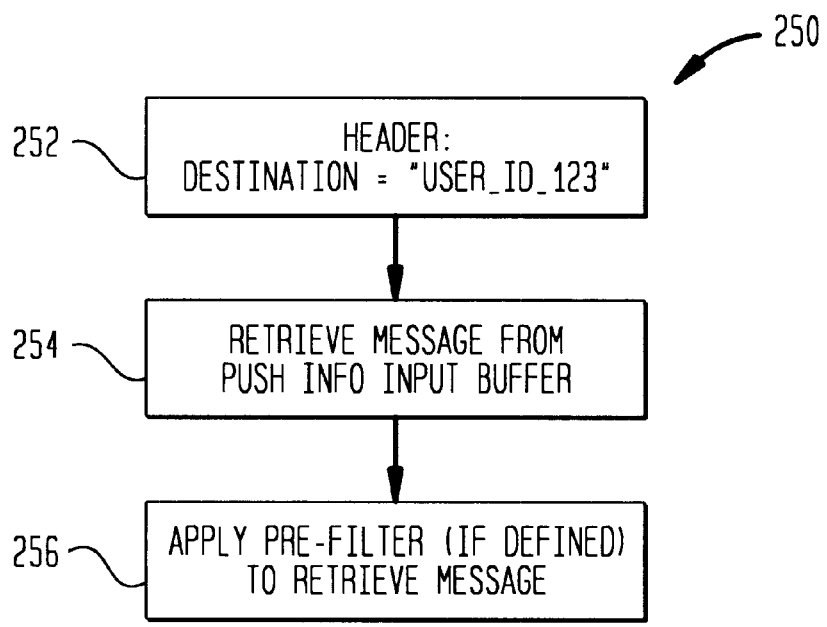

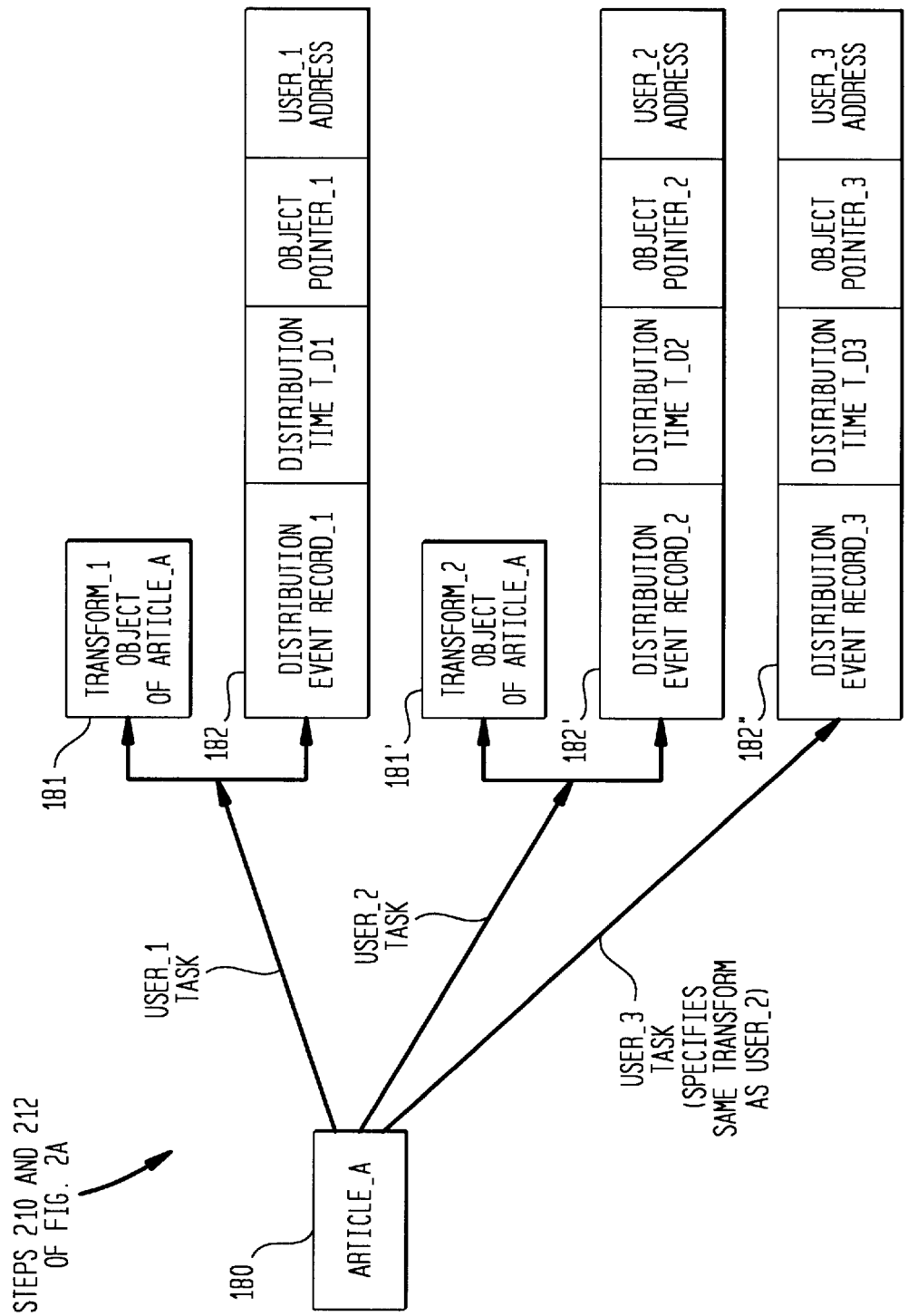

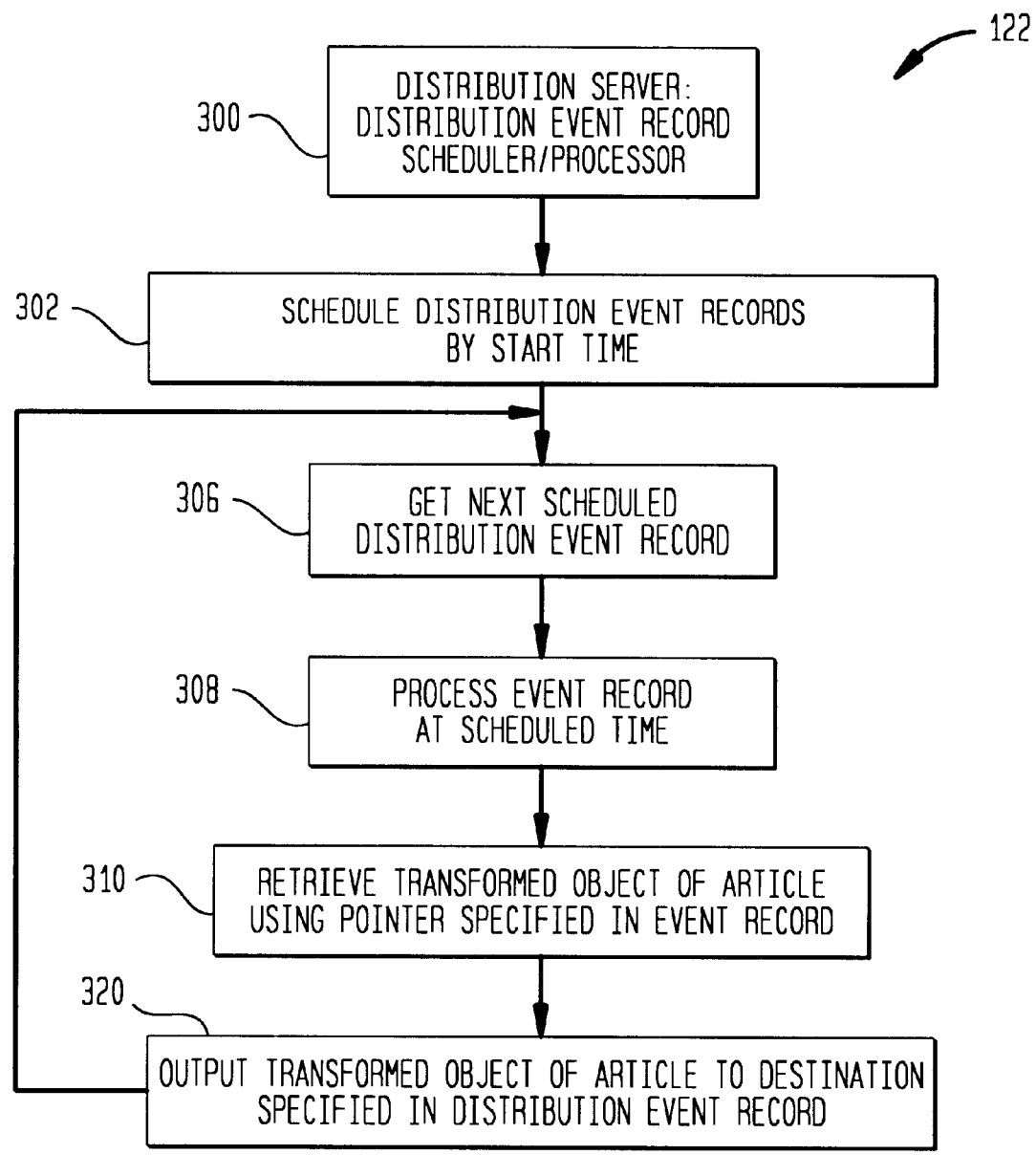

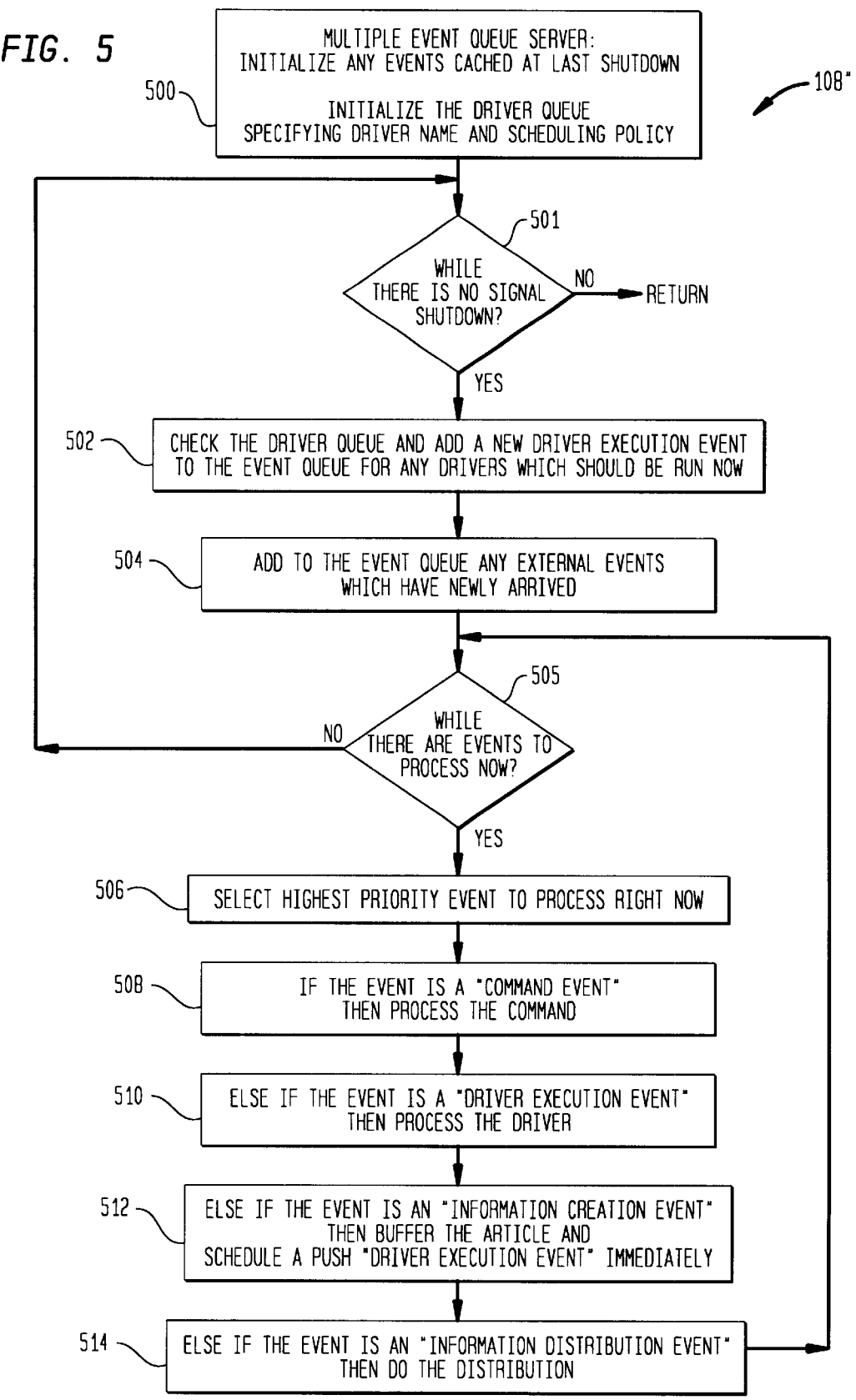

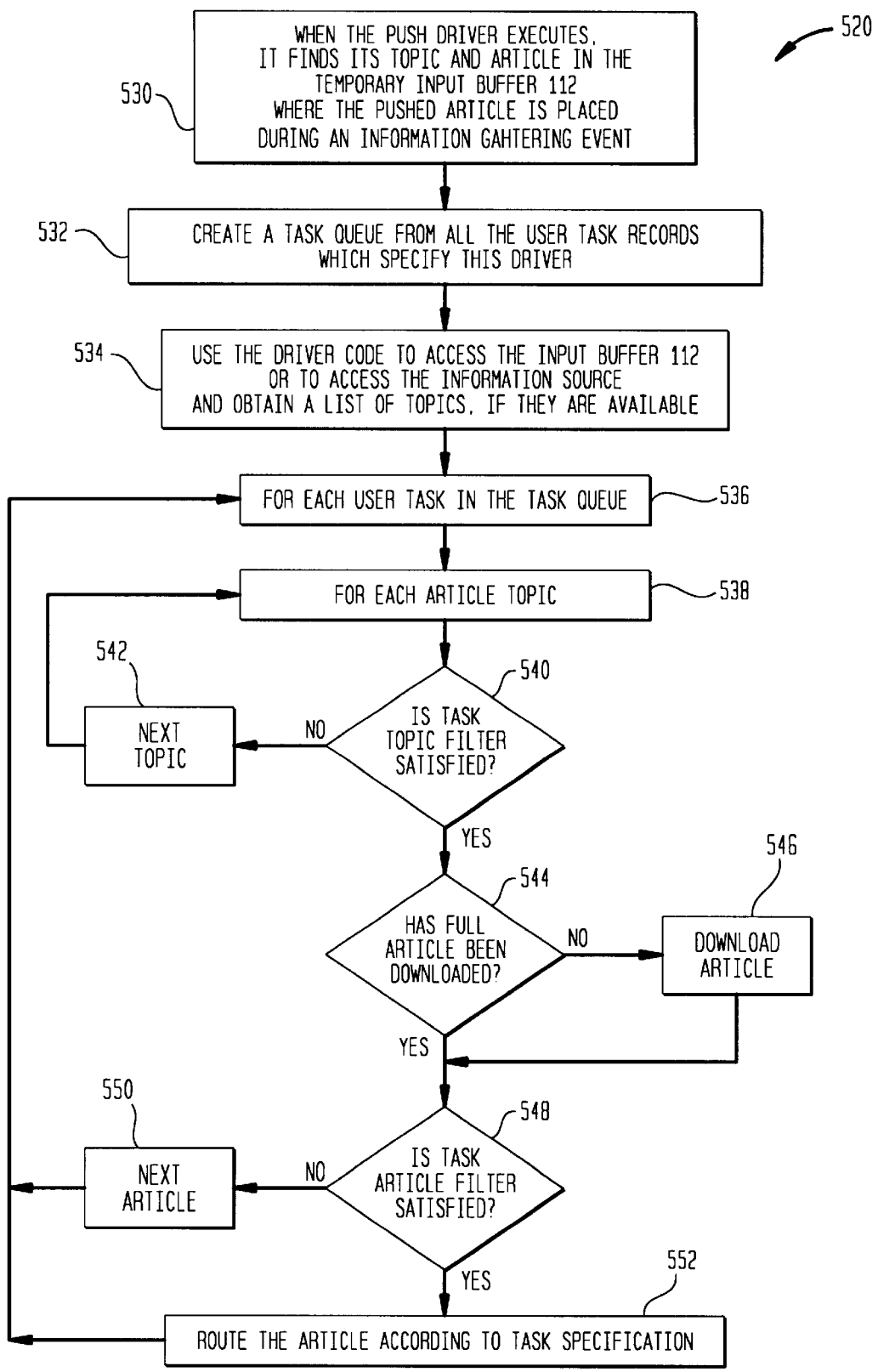

INFORMATION STREAM MANAGEMENT PUSH-PULL BASED SERVER FOR GATHERING AND DISTRIBUTING ARTICLES AND MESSAGES SPECIFIED BY THE USER

FIELD OF THE INVENTION

The invention disclosed broadly relates to telecommunications network architectures and more particularly relates to servers for managing information streams in a telecommunications network.

BACKGROUND OF THE INVENTION

The invention disclosed herein is related to the inventions described in U.S. Pat. No. 5,802,510, by Mark Alan Jones, entitled "Universal Directory Service"; U.S. Pat. No. 5,742,763, by Mark Alan Jones, entitled "Universal Message Delivery System for Handles Identifying Network Presences;" and U.S. Pat. No. 5,832,221, by Mark Alan Jones, entitled "Universal Message Storage System", all of which are assigned to AT&T Corp., and are incorporated herein by reference for their disclosure of the concepts of a network presence, a directory system, a message delivery system, and a message storage system which are related to the invention disclosed herein.

Existing network information management technologies, such as the browser-centric technology of the Internets World Wide Web, require an immediate response by network information sources, such as news services, to requests for the information by the client. Internet browsers act as information gatherers by going out over the network to a specific information source and requesting information, such as an article. The information source can maintain a channel definition format file for that particular client. When the client makes a request to for an article from the source, the source must immediately respond with the requested article. The article is custom formatted and routed especially for the requesting client using the channel definition format. The requirement of an immediate and customized response in browser-centric technologies is a burden to the information source.

What is needed is to change from the existing client side model and, instead, maintain the source's information in a highly networked service environment. In this manner, the information source would not be constrained to deliver the information at the time and in the form that each client requests. It would not be necessary for an information source to immediately respond to multiple clients requesting the same article to be delivered in individually customized formats. What is needed is a network service that can break the linkage between the mode in which information is gathered and the mode in which it is distributed, that linkage being referred to as mode locking. Mode locking arises where the source of information is incompatible with the destination of the information, such as where there are differences in protocol (e.g., HTTP vs. SMTP email protocol), differences in data format (e.g., HTML vs. RFC-822 email standards), differences in senses (speech vs. text or image vs. text), or differences in content expression (e.g., French vs. English). What is needed is a way to break the mode locking inherent in browser-centric network technologies. This would enable a significant improvement in flexibility for obtaining and disseminating information in a network. Customized services for a client such as the translation from one language to another or the summarization of articles could be performed independently of the task of gathering the article from the information source.

SUMMARY OF THE INVENTION

An information stream management network server is disclosed that enables distributing articles and messages to a destination in the network at times and in forms that are specified by a user, while also enabling accessing and receiving the articles and messages from sources in the network at times and in forms that are independent of the user. The network server handles both information pull articles and information push articles. The information push articles use declarative addressing to specified groups of users, thereby masking recipient endpoint identities and delivery preferences from sources and enabling broadcast communication to members of such a group.

Several embodiments of the invention are disclosed. In a first embodiment, the information stream management network server, includes an information gathering server and an information distribution server whose respective gathering and distribution functions are kept separate and are respectively defined by a system supervisor and by the endpoint users.

The information gathering server has an input from a network for accessing information pull articles from information pull sources in the network and for receiving information push articles from information push sources in the network. The information gathering server has at least one pull event driver having a specified pull event schedule for accessing articles from a specified information pull source in the network. A supervisory input independent of end users, provides the specified pull event schedule. The information gathering server includes an event driver queue processor including a scheduler to schedule pull source event drivers by their respective specified next pull event start times. The event driver queue processor selects a next scheduled pull event driver and runs it at the specified pull event start time to access articles from a specified pull source. Then, for every received article requested by at least one user, the event driver queue processor performs customized transformations on the article specified by the users and stores the transformed article objects in a buffer memory.

For the case of information push articles (such as email messages), the information gathering server includes at least one push event driver for receiving push articles from the information push sources in the network addressed to a declarative address specified by the endpoint user. The information gathering server includes an information push input buffer for buffering any push articles received from the information push sources. The event driver queue processor determines whether any push articles have been received from the information push sources addressed to the declarative address specified by the user. If so, it immediately selects and runs a push event driver in the information gathering server for such information push articles. Then, the push articles are treated in a manner similar to the articles from pull sources. For every received push article addressed to a user, the event driver queue processor performs customized transformations on the push article specified by the user and stores the transformed article object in the buffer memory. The transformed push article may also be immediately forwarded to the distribution server for distribution to the end user, if the user has specified immediate delivery.

The endpoint users define user task records that each specify an article type to be gathered, a customized transformation of that article type into a transformed object, a customized routing of the transformed object, the user's destination address, and the time of distribution of the transformed object to the destination address. After the information gathering server has executed an event driver for gathering a pull article or a push article from a source which has been specified by at least one user task definition, the event driver queue processor loops through all of the user task records to perform every type of transformation specified for the article. The customized transformations can be changing the senses (speech to text or image to text) or changing the content, such as to produce notifications, summaries, language translations, compendiums, format conversions, and the like. The transformed article object is then stored in a memory buffer.

For each type of transformed article object, the event driver queue processor creates a distribution event record for each user requesting it, specifying the distribution time requested by the user, the user's destination address for the object, and a memory pointer to the object. The distribution event records are then stored in a memory buffer.

The information distribution server has an input from the buffer memory and an output to the network. The information distribution server can access the distribution event records which have the distribution start time specified by the user for retrieving the transformed article objects from the buffer memory. The information distribution server can also access the user task records that specify the distribution routing, storage, and endpoint destination specifications provided by the user for distributing the articles in the network. A distribution event queue processor in the information distribution server includes a scheduler to schedule distribution event records by their respective the distribution event start times. The distribution event queue processor selects a next scheduled distribution event record and runs it at the distribution event start time to retrieve the articles from the buffer memory. Then, the distribution event queue processor outputs the retrieved transformed article objects using the specified storage and routing paths to an endpoint destination specified in the distribution event record.

Each push event driver extracts a declarative address from the envelope of the pushed article. The declarative address is a query that is evaluated to produce a set of address handles corresponding to specific end users. For each such user, that user's push task record will be invoked to transform the article for that user. The task record then provides the routing information for distribution of the transformed article.

The buffer memory stores in a database the transformed articles accessed by the pull event driver and the push event driver. The buffer memory can store the push articles by the declarative address of the intended destination. The distribution server can include the declarative address information for retrieving from the database the transformed articles from the information push sources addressed to the declarative address.

In another embodiment, the information gathering server and information distribution server are combined as a multiple event queue server. The multiple event queue server has an input coupled to a network for accessing articles from information pull sources in the network. At least one pull event driver in the server, has a specified driver execution time for accessing articles from a specified information pull source in the network. A supervisory input coupled to the server provides the specified driver execution time. A storage coupled to the server stores the articles accessed by the pull event driver. The multiple event queue server is coupled to the storage and to the network, and has at least one user task record specified by the user, the record including a distribution execution time specified by the user for retrieving the articles from the storage and a distribution format specified by the user for distributing the articles to a destination in the network specified by the user. The multiple event queue server distributes the articles to the destination in the network at times and in forms that are specified by the user, while the server accesses the articles from the sources in the network at times and in forms that are independent of the user.

The multiple event queue server includes an event queue processor with a scheduler to schedule events by their respective execution times. The event queue processor selects a next scheduled event and runs it at the specified execution time to process the scheduled event. The multiple events include command events, driver execution events, information creation events, and information distribution events.

The multiple event queue server selectively modifies the retrieved articles as specified in the user task record, forming objects which are stored in the storage. The event queue processor selects a next scheduled driver execution event record and runs it at the execution time to retrieve the objects from the storage. The event queue processor outputs the objects to a destination specified in the user task record using a format specified in the user task record.

The multiple event queue server includes an information push input buffer for buffering any articles received from information push sources in the network. The event queue processor determines whether any articles have been received from the information push sources addressed to a declarative address, and immediately selects and runs a push event driver server for such information push articles. The event queue processor outputs the articles received from the information push sources to the storage.

In this manner, the server distributes the articles and messages to destinations in the network at times and in forms that are specified by the user, while the server accesses and receives the articles and messages from the sources in the network at times and in forms that are independent of the user.

DESCRIPTION OF THE FIGURES

FIG. 2A is a flow diagram of the event driver queue processor in the information gathering server in accordance with the first embodiment the invention.

FIG. 2B is a flow diagram of a pull event driver in the information gathering server.

FIG. 2C is a flow diagram of a push event driver in the information gathering server.

FIG. 2D shows how steps 210 and 212 of FIG. 2A result in producing transformed objects of articles and in producing distribution event records.

FIG. 3A is a flow diagram of the distribution event queue processor in the information distribution server in accordance with the first embodiment the invention.

FIG. 5 is a flow diagram of the multiple event queue processor embodiment, for the architecture of FIG. 4A.

FIG. 5A is a flow diagram of the push driver process, as a component of the multiple event queue processor embodiment of FIG. 5.

DISCUSSION OF THE PREFERRED EMBODIMENT

Figure 1:
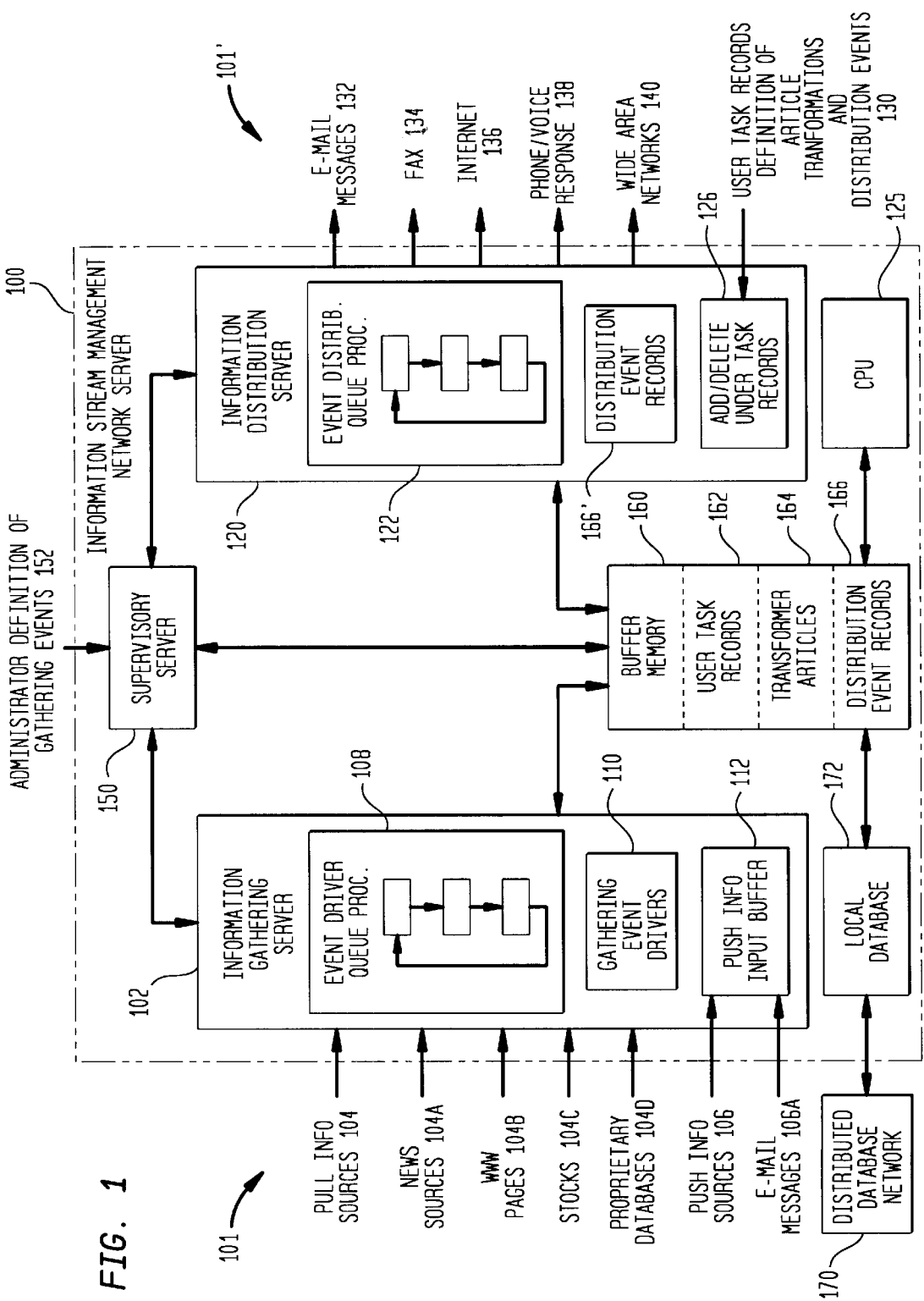
FIG. 1 is an architectural block diagram of the information stream management network server, in accordance with a first embodiment the invention.

The first embodiment of the information stream management network server 100 is shown in architectural block diagram form in FIG. 1. The server enables distributing articles and messages to a destination in the network at times and in forms that are specified by an endpoint user, while also enabling accessing and receiving the articles and messages from sources in the network at times and in forms that are independent of the endpoint user. The term "articles" as used herein, pertains to both an information pull model and an information push model. In an information pull model, the server accesses an information source in the network and requests information which is delivered to the server in response to the request and also to. In an information push model, information is spontaneously sent from sources in the network to the server. The network server 100 handles both information pull articles and information push articles from the network. The information push articles use declarative addressing to specify groups of users, thereby masking the recipient endpoint identities and delivery preferences from the sources and also enabling broadcast communication to members of such a group.

The information stream management network server 100 of FIG. 1 includes an information gathering server 102 and an information distribution server 120 whose respective gathering and distribution functions are kept separate and are respectively defined by a supervisory server 150 which accepts a system administrator's definition of gathering events 152. Distribution functions are defined by the endpoint users over path 130 to the information distribution server 120. The central processing unit (CPU) 125 in the information stream management network server 100 executes program instructions to perform the various functions of the network server 100.

The information gathering server 102 has an input connected to the network 101 for accessing information pull articles from information pull sources 104 such as news sources 104A, worldwide web (www) pages 104B, stocks and securities information 104C, and propriety databases 104D. The information gathering server 102 also receives over the network 101 information push articles from information push sources 106 such as e-mail messages 106A, calendar updates, reminders, and the like which are spontaneously sent to the server 100 from the network 101. The information gathering server 102 has a plurality of pull event drivers 110 which are shown in greater detail as pull event driver 230 of FIG. 2B. The pull event driver 230 includes a header 232 which specifies a start time T1, an access protocol such as HTTP, and a source name such as "Reuters". The pull event driver 230 executes a sequence of steps including step 234 to access articles from the specified source at the source's network address, followed by step 236 which applies a prefilter, if it is defined, to the accessed articles. The specified pull event start time T1 establishes the time for accessing information pull articles from a specified information pull source 104 in the network 101. In accordance with the invention, a supervisory input 152 from the network administrator, as shown in FIG. 1, which is independent of the end users, provides a specified pull event start time T1, and the other specified parameters of the pull event driver 230 in FIG. 2B. The information gathering server 102 further includes an event driver queue processor 108 which is shown in greater detail in FIG. 2A. The event driver queue processor 108 includes a header 200 and a scheduler which performs the step 202 of scheduling pull source event drivers by their respective start times T1. Thereafter, step 204 determines if there are any information push articles pending in the information push input buffer 112 of the information gathering server 102 of FIG. 1. If there are no information push articles pending, then step 206 gets the next scheduled pull event driver 230. Step 207 determines if any user-defined task record 330 shown in FIG. 3B has specified this event. If a task record 330 has specified the event, then Step 208 runs the event driver 230 at its scheduled time T1.

Then, in step 210, for every received article requested by at least one user in a user task record 330, the event driver queue processor performs customized transformations on the article specified by the users in their user task records 330 and stores the transformed article objects in a buffer memory 160 at partition 162 of FIG. 1. The endpoint users define user task records 330 of FIG. 3B that each specify an article type to be gathered 332, a customized transformation of that article type into a transformed object 338, a customized routing of the transformed object 340, the user's destination address 336, and the time of distribution of the transformed object to the destination address 332. After the information gathering server 102 has executed an event driver 230 for gathering a pull article or an event driver 250 for gathering a push article from a source which has been specified by at least one user task definition 330 or 330', the event driver queue processor 108 of FIG. 2A in step 210 loops through all of the user task records 330 to perform every type of transformation specified for the article. The customized transformations can be changing the senses (speech to text or image to text) or changing the content, such as to produce notifications, summaries, language translations, compendiums, format conversions, and the like. The transformed article object is then stored in a memory buffer 160 at partition 164 of FIG. 1.

FIG. 2D shows the results of steps 210 and 212 of FIG. 2A for an article 180 ARTICLE_A that is operated on by transformation subroutines which are called using each of three user task records 330, USER_1, USER_2, USER_3. The USER_1 task record results in creating the transformed article 181, TRANSFORM_1 object of ARTICLE_A, which could be a transformation from a full text article 180 to a summary that is expressed as a voice record 181, for example. The USER_2 task record results in creating the transformed article 181', TRANSFORM_2 object of ARTICLE_A, which could be a transformation from a full text article in English 180 into a full text article in French 181'. The USER_3 task record could specify the same transformation as the USER_2 task record. For each type of transformed article object 181, the event driver queue processor 108 in step 212 creates a distribution event record 182 shown in FIG. 2D for each user requesting the transformed article object 181, specifying the distribution time requested by the user, the user's destination address for the object, and a memory pointer to the object 181. The distribution event records are then stored in a memory buffer 160 in partition 166 of FIG. 1. Distribution event records 182' and 182" are generated for the transformed article 181', TRANSFORM_2 object of ARTICLE_A.

For the case of information push articles, the information gathering server 102 includes a plurality of push event drivers such as the push event driver 250 of FIG. 2C. The push event driver 250 of FIG. 2C includes the header 252 which can specify the destination in the form of a user address or a declarative address. The push event driver 250 carries out the steps beginning with step 254 of retrieving an information push article from the push information input buffer 112 of the information gathering server 102 of FIG. 1. Thereafter, step 256 applies a prefilter, if it is defined, to the retrieved message. In the event driver queue processor 108 of FIG. 2A, if the step 204 determines that an information push article is present at the information push input buffer 112, then step 216 gets the information push event driver 250 for the message destination specified by the received message. This will typically be user destination address or a declarative address such as "GROUP ID". Step 217 determines if any user task record 330' of FIG. 3C has specified this event. Then step 218 immediately runs the event driver 250.

Then, in step 210, for every received push article requested by at least one user in a user task record 330', the event driver queue processor performs customized transformations on the article specified by the users in their user task records 330' and stores the transformed article objects in a buffer memory 160 at partition 162 of FIG. 1. For each type of transformed push article object 181, the event driver queue processor 108 in step 212 creates a distribution event record 182 shown in FIG. 2D for each user requesting the transformed article object 181, specifying the distribution time requested by the user, the user's destination address for the object, and a memory pointer to the object 181. The distribution event records are then stored in a memory buffer 160 in partition 166 of FIG. 1. Note that the transformed objects of information push articles are treated in the same way are the transformed objects of information pull articles.

Each push event driver 250 extracts a declarative address from the envelope of the pushed article. The declarative address is a query that is evaluated to produce a set of address handles corresponding to specific end users. For each such user, that user's push task record 330' will be invoked to transform the article for that user. The task record 330' then provides the routing information for distribution of the transformed article. This process is described in greater detail in the U.S. Pat. No. 5,742,763, by Mark Alan Jones, entitled "Universal Message Delivery System for Handles Identifying Network Presences," assigned to AT&T Corp., and incorporated herein by reference.

The buffer memory 160 stores in a database the transformed articles accessed by the pull event driver 230 and the push event driver 250. The buffer memory can store the push articles by the declarative address of the intended destination. The distribution server 120 can include the declarative address information for retrieving from the database the transformed articles from the information push sources addressed to the declarative address.

The information distribution server 120 of FIG. 1 has an input from the buffer memory 160 and an output to the network 101', which can be the same as the network 101 of FIG. 1. The network 101' includes endpoint user work stations, network routers, network bulk storage devices, and other network components. The network 101' can convey e-mail messages 132, facsimile transmissions 134, Internet transmissions 136, telephone voice response sounds 138, digital messages to wide area networks 140, and the like. Importantly, the network 101' will convey over path 130, the endpoint user's task records 330 and 330' which are applied to the add/delete user task records unit 126 of the information distribution server 120 of FIG. 1 and stored in buffer memory 160 in partition 162. The information distribution server 120 can access the buffer memory 160 for user task records, transformed articles, and distribution event records.

Figure 3B:
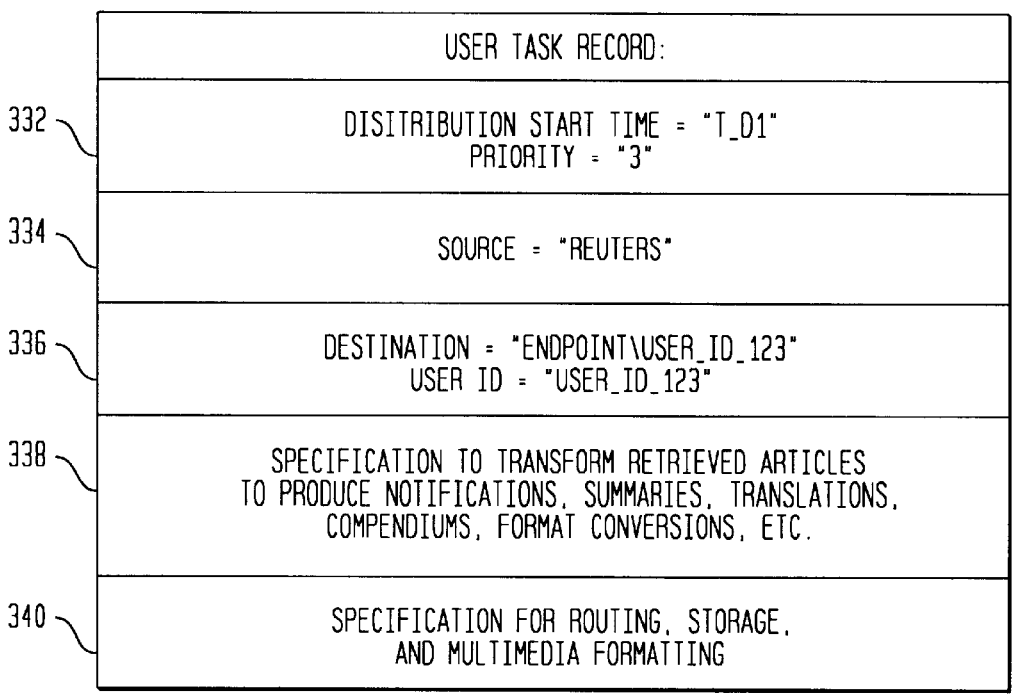
FIG. 3B illustrates a user task record for an information pull article.
Figure 3C:
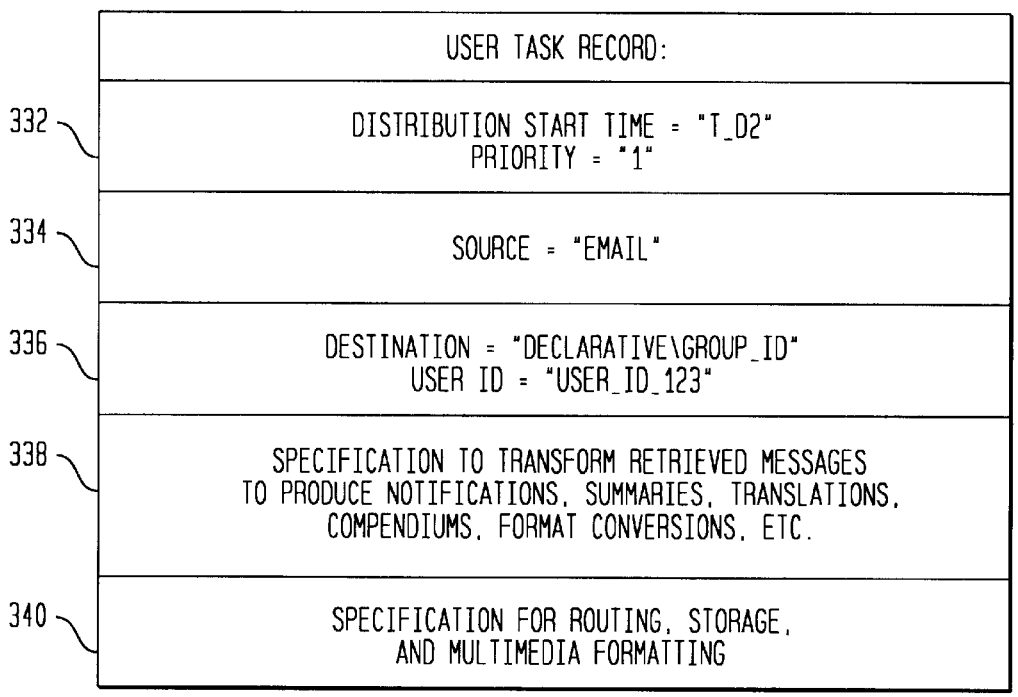
FIG. 3C illustrates a user task record for an information push message, which includes a declarative addressing specification.

Two examples of user task records 330 and 330' are shown in FIGS. 3B and 3C, respectively. The user task record 330 of FIG. 3B has its parameters defined by the endpoint user's definition of transformations and distribution events. The user task record 330 includes a specified start time "T_D1" and a priority "3" in field 332. It further includes a source of "Reuters" in field 334. It further includes a specified destination which, in this case, is an endpoint destination "USER_ID_123". Field 336 also includes the user id which is "USER_ID_123". Field 338 includes a specification provided by the user of how to transform retrieved articles to optionally produce notifications, summaries, translations, compendiums, format conversions, and the like. Field 340 is a specification by the user of special routing, storage, and multimedia formatting for the transformed article objects. FIG. 3C shows a distribution event record 330' which is for an information push type message having an e-mail source. The field 336 specifies that the destination is a declarative address which is "GROUP_ID". The user id is the same user as in FIG. 3B, "USER_ID_123". Field 338 specifies the transformations desired by the endpoint user for processing retrieved push articles and field 340 specifies user's desire for any special routing, storage or multimedia formatting for the transformed article objects.

The information distribution server 120 includes a distribution event queue processor 122 which is shown in greater detail in FIG. 3A. The distribution event queue processor 122 includes a header 300 and a scheduler which performs the step 302 of scheduling the distribution event records by their respective start times T_D1, T_D2, etc. Recognition can be made of the relative priority assigned by the user to the respective distribution event records in establishing the scheduled order. Next, the distribution event queue processor 102 gets the next scheduled distribution event record in step 306. Then in step 308 the event record is processed at the scheduled time T_D1, T_D2, etc. Thereafter, step 310 retrieves the transformed article objects from partition 164 of the buffer memory 160 as specified in the user task records 330 and 330'. The destination specified in the user task record can be a declarative address for a group or alternately it can be an endpoint address for the endpoint user. Thereafter, step 320 outputs the transformed article objects to the specified destination using the optional multimedia format, routing and/or storage features specified in the user task record 330 and 330'.

FIG. 5 shows the buffer memory 160 which stores user task records, transformed article objects, and distribution event records. The buffer memory 160 can off load these objects and records to backing storage, for example the distributed database network 170 and the local database 172. The buffer memory 160 stores in a database therein the transformed article objects accessed by the pull event driver and the push event driver. The buffer memory 160 can store the push articles by the declarative address of the intended destination. Each event driver 230 and 250 includes information such as address information, for storing the transformed article objects in the database. The distribution server 120 includes the address information for retrieving from the database the transformed article objects. Each push event driver 250 can include a declarative address information for storing in the database the transformed article objects from the information push sources addressed to the declarative address. The distribution server includes the declarative address information for retrieving from the database the transformed article objects received from the information push sources addressed to the declarative address.

Transformed article objects can be stored in the buffer memory 160 using source handles such as "Reuters" and such as "DowJones" for storing transformed information pull article objects from specified information pull sources 104.

Transformed article objects can be stored in the buffer memory 160 using declarative address information, e.g. "GROUP_1" and "GROUP_2" for storing transformed information push article objects from the information push sources 106 addressed to the declarative addresses. Each pull event driver 230 of FIG. 2B includes the source address information 232 in header 232 for storing in the buffer memory 160 the transformed article objects derived from the specified information pull source which is specified in the header 232. The distribution server 120 includes the source address information in field 334 of the record in FIG. 3B for retrieving from the buffer memory 160 the transformed information pull article objects derived from the specified information pull source. Each push event driver 250 in FIG. 2C includes a declarative address information in the header 252 for storing in the buffer memory 160 the transformed information push article objects from the information push sources 106 addressed by the declarative address specified in the header 252. The distribution server 120 includes in the user task record 330' of FIG. 3C, the declarative address information in field 336, for retrieving from the buffer memory 160 transformed information push article objects derived from the information push sources 106 addressed to the declarative address specified in the field 336. The buffer memory 160 can also include an endpoint address information derived from endpoint user addresses, so that any transformed information push article objects designated for an endpoint user can be stored by the information gathering server 102 and can be accessed by the information distribution server 120. The distribution server 120 can also include a channel directory which is accessible by the endpoint user. The channel directory is organized with endpoint user addresses for storing pointers for each respective endpoint user, which point to transformed article objects stored on behalf of the user, elsewhere in the local or distributed databases 172 and 170.

In this manner, the information distribution server distributes the articles to destinations in the network at times and in forms that are specified by the user, while the information gathering server accesses and receives the articles from the sources in the network at times and in forms that are independent of the user.

Figure 1A:
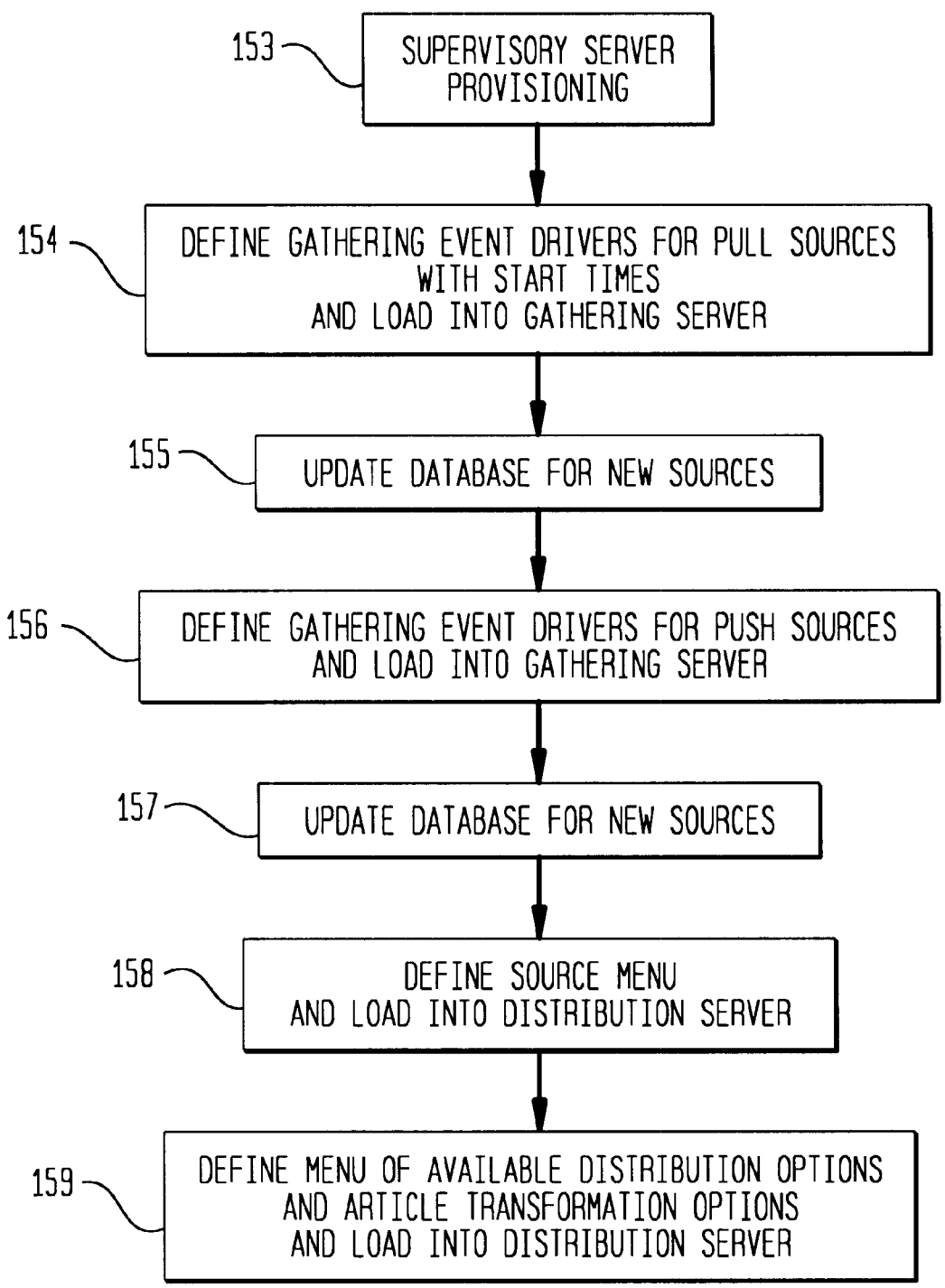
FIG. 1A is a flow diagram of provisioning the information stream management network server by the supervisory server in accordance with the first embodiment the invention.

FIG. 1A illustrates the system administrator's definition of gathering events for the information gathering server 102. In FIG. 1A, the supervisory server provides the provisioning for the gathering event drivers. Beginning at the header 153 in FIG. 1A, step 154 defines gathering event drivers 230 for information pull sources with start times and source address information which are loaded into the information gathering server 102. Then in step 155, the database in the buffer memory 160 is updated for new sources. Then step 156 defines gathering event drivers 250 for information push sources with destination address information and loads them into the information gathering server 102. Then in step 157, the database in the buffer memory 160 is updated for new sources. In order to provide information which will be available to the user as to existing information pull and information push sources which are available, step 158 defines pull and push source menus address information which are loaded into the distribution server. These pull and push source menus are available to the endpoint user when the endpoint user is defining user task records. In a similar manner, step 159 defines a menu of available distribution options and article transformation options which is loaded into the information distribution server 120 and is made available to endpoint users for their use when defining user task records.

An endpoint user can update user task records by requesting menus from the distribution server 120, which sends the existing source menu and distribution and transformation options menu to the endpoint user. Then distribution server 120 receives the user's request for a new user task record 330 with a distribution start time, a pull source, for example "Reuters", and article processing specifications such as how the retrieved article is to be summarized, translated to a particular language, and how the processed article will then be routed, stored and formatted. Then the distribution server checks to see if the specified pull source has an existing source address information. Then, if there is no existing source address information, the distribution server sends a request for a new pull source and new address information to the supervisory server 150. Then, the supervisory server 150 determines whether to grant the request. If the decision is not to grant the request, then the supervisory server sends a denial notice to the distribution server 120. Alternately, if the supervisory server 150 determines that the parameters requested in the user's request need to be modified, then the supervisory server sends a modified gathering event driver with an appropriate prefilter to the gathering server 102. Alternately, if the supervisory server 150 determines to grant the user's request, then the supervisory server sends a new gathering event driver 230 having a new gathering start time and a new address information to the information gathering server 102. Then, the supervisory server 150 sends a new address information to the buffer memory 160 and to the distribution server 120. Then, the distribution server 120 creates a new user task record 330, such as is shown in FIG. 3B, with a specified distribution start time, a pull source such as "Reuters" and article processing, formatting, routing, and storage options specified, and a specified destination which may be either an endpoint user address or a declarative address. A similar operation can be performed for creating a user task record 330' for an information push type source, such as is shown in FIG. 3C.

Figure 4A:
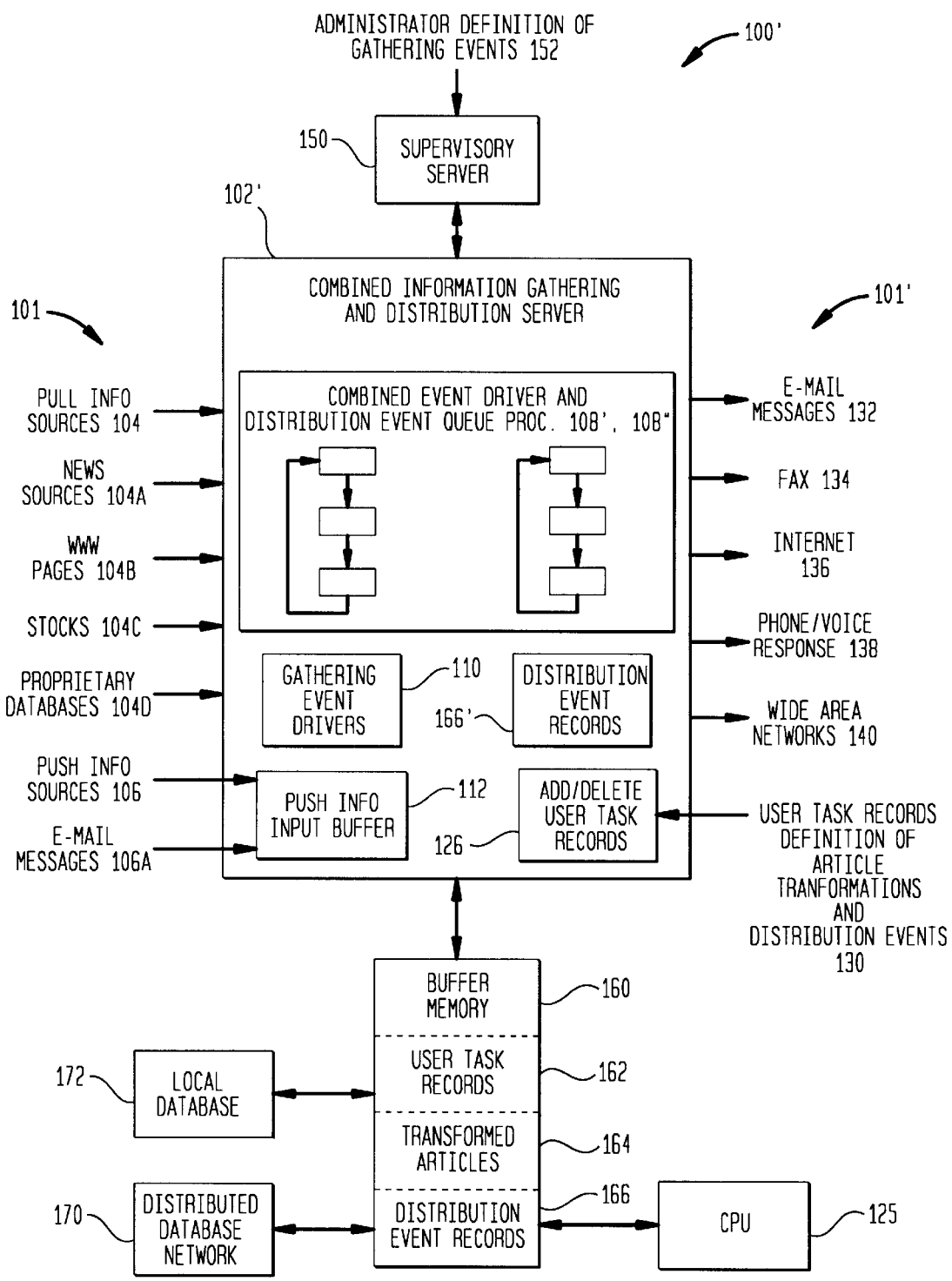
FIG. 4A is an architectural block diagram of the information stream management network server, which combines the information gathering server and the distribution server, in accordance with a second embodiment the invention.

FIG. 4A is an architectural block diagram of the information stream management network server 100', which combines the information gathering server and the distribution server, in accordance with a second embodiment the invention.

In the second embodiment, the information gathering server and information distribution server are combined as a multiple event queue server 102'. The multiple event queue server has an input 104 coupled to the network for accessing articles from information pull sources in the network. At least one pull event driver 230 in the server, has a specified driver execution time for accessing articles from a specified information pull source in the network. A supervisory input 150 coupled to the server provides the specified driver execution time. A storage 160 coupled to the server stores the transformed article objects of articles accessed by the pull event driver. The multiple event queue server 102' is coupled to the storage 160 and to the network, and has at least one user task record 330 specified by the user, the record including a distribution execution time specified by the user for retrieving the transformed article objects from the storage 160 and a distribution format specified by the user for distributing the articles to a destination in the network specified by the user. The multiple event queue server 102' distributes the transformed article objects to the destination in the network at times and in forms that are specified by the user, while the server 102' accesses the articles from the sources in the network at times and in forms that are independent of the user.

FIG. 5 is a flow diagram of the multiple event queue processor embodiment 108", for the architecture of FIG. 4A. The multiple event queue server 102' includes an event queue processor 108" with a scheduler to schedule events by their respective execution times. The event queue processor 108" selects a next scheduled event and runs it at the specified execution time to process the scheduled event. The multiple events include command events, driver execution events, information creation events, and information distribution events.

Figure 5B:
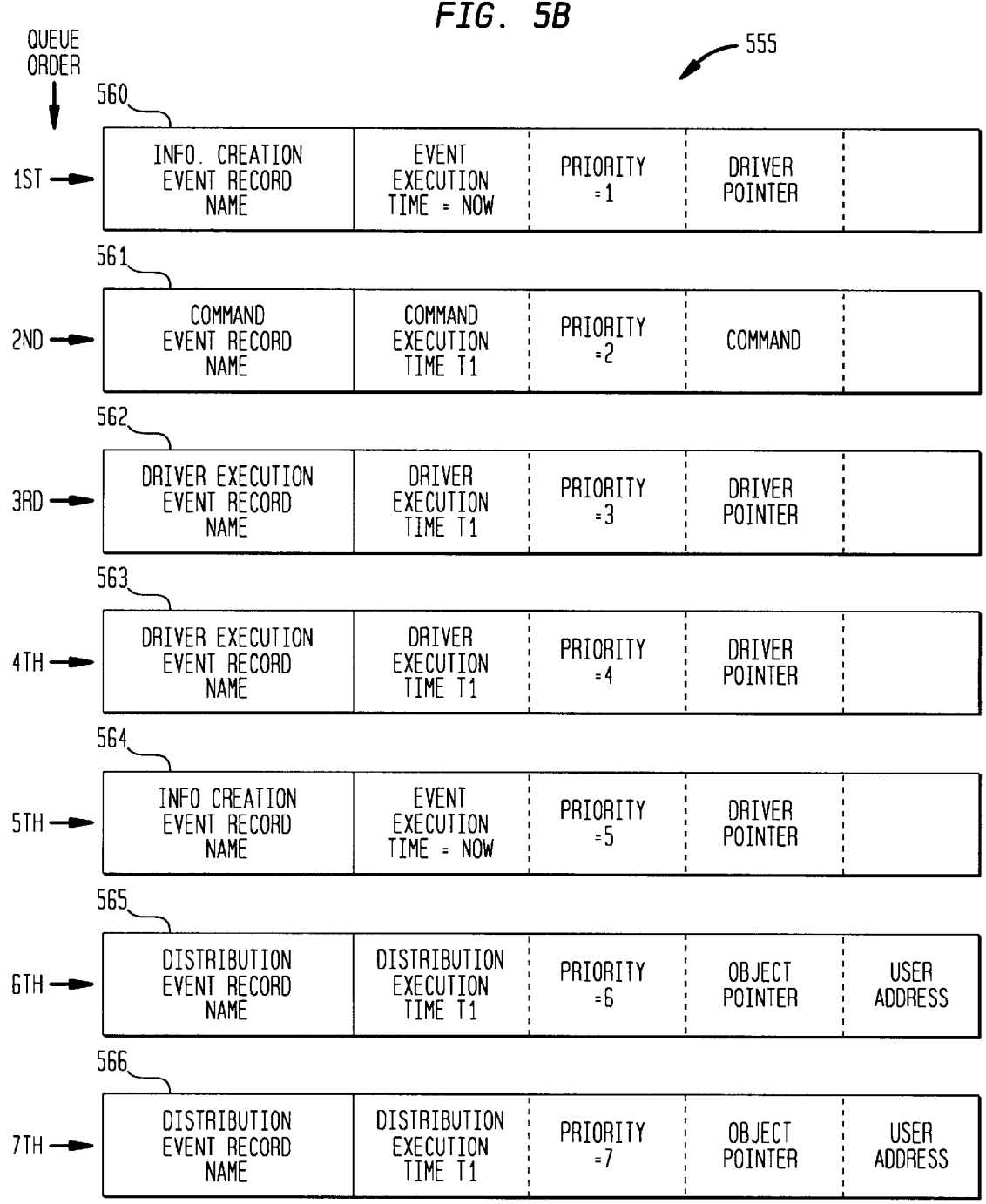
FIG. 5B illustrates an example of the multiple event queue operated on by the multiple event queue processor embodiment of FIG. 5.

Command events are server administrative functions such as the allocation of memory, and are typically issued by the supervisory server 150. Driver execution events are the execution of the pull driver 230 or the push driver 250. Information creation events place the newly arrived pushed article into the temporary input buffer 112. Information distribution events are the delivery of transformed article objects to the end user. Each type of event is represented by an event record 560–566, as is shown in FIG. 5B. The event records are arranged into a multiple event queue 555 in their order of time of execution and within that time, by their relative priority. FIG. 5B illustrates an example of the multiple event queue 555 operated on by the multiple event queue processor embodiment 108" of FIG. 5. The flow diagram of FIG. 5 enables multiple event queues 555 of different priority. It chooses events based first on time and then on priority. Its steps are as follows:

Step 500: initialize event queues from a database with any events that were cached when the server was last shut down and initialize the driver queue from a database (this specifies the name of the drivers and the scheduling policy).

Step 501: while there is no signal to shutdown:

Step 502: consult the driver queue and add a new driver execution event to the event queue for any drivers which should be run now.

Step 504: add to the event queue any external events which have newly arrived.

Step 505: while there are events to process right now.

Step 506: select the highest priority event to process right now

Step 508: if the event is a COMMAND EVENT then process the command (see event record 561 of FIG. 5B)

Step 510: else if the event is a DRIVER EXECUTION EVENT then execute the driver (see event records 562 and 563 of FIG. 5B)

Step 512: else if the event is an INFORMATION CREATION EVENT then buffer the article and schedule a push DRIVER EXECUTION EVENT immediately (see event records 560 and 564 of FIG. 5B)

Step 514: else if the event is an INFORMATION DISTRIBUTION EVENT then do the distribution (see event records 565 and 566 of FIG. 5B)

The term "execute the driver" is defined as follows. The system acknowledges the fact that many information sources have "levels" of information associated with an article. For example, there may be an abstract or a subject as well as the complete article. The system allows a user task to match against this "topic" and/or against the complete article if specified. This can potentially save expensive downloads of large, irrelevant articles. To force downloading when no topic match is available or desired, the task's topic filter merely returns "true". To force acceptance of any downloaded article, the task's article filter merely returns "true".

FIG. 5A is a flow diagram of the push driver process 520, which is a driver execution event for push articles located in the temporary input buffer 112, in the multiple event queue processor embodiment 108" of FIG. 5. Note that when the "push driver" executes, it finds its topic and article in the temporary input buffer 112 where the pushed article is placed during an information creation event, as stated in step 530. The flow diagram proceeds through the following steps:

Step 532: create a task queue from all the user task records which specify this driver.

Step 534: use the driver code to access the information source or input buffer 112 and obtain a list of topics, if they are available.

Step 536: start an outer loop for each task in the task queue

Step 538: start an inner loop for each article topic

Step 540: if the task's topic filter is satisfied then go to step 544. Otherwise, select the next topic at step 542 and return to step 538.

Step 544: if the full article is not already downloaded then download it to the buffer memory 160 at step 546 and go to step 548.

Step 548: if the task's article filter is satisfied then go to step 552. Otherwise select the next article and return to step 536.

Step 552: route the article according to the task specification and return to step 536.

The term "route the article according to the task specification" is defined as follows: The user task record specifies a set of distribution specifications. Each specification consists of a destination and a time of distribution. A destination has a type (channel, email, fax, printer, etc.) and an address of the appropriate type for the destination (channel number, email address, fax number, printer name, etc.) If the address is omitted, then the address is determined from the type and the contact information that the system has stored in the user database (e.g., the system looks up the user's fax number if the destination type was fax). For each distribution specification, an INFORMATION DISTRIBUTION EVENT is generated. By default, these events are added to the multiple event queue 555 of the event queue processor 108", but the server can be configured to pass some of the distribution events on to other servers.

The term "do the distribution" is defined as follows: The system uses a modular architecture for distribution events similar to that for acquisition. The distribution type maps to a "distribution driver" that handles distribution for that type.

The multiple event queue server 102' selectively modifies the retrieved articles as specified in the user task record 330, forming objects which are stored in the storage 160. The event queue processor 108" selects a next scheduled information distribution event record in the multiple event queue of FIG. 5B and runs it at the execution time to retrieve the objects from the storage. The event queue processor 108"

outputs the objects to a destination specified in the user task record 330 using a format specified in the user task record 330.

The multiple event queue server 102' includes an information push input buffer 112 for buffering any articles received from information push sources in the network. The event queue processor 108" determines whether any articles have been received from the information push sources addressed to a declarative address, and immediately selects and runs a push event driver server 250 for such information push articles. The event queue processor 108" outputs the transformed article objects derived from the information push sources to the storage 160.

Figure 4B:
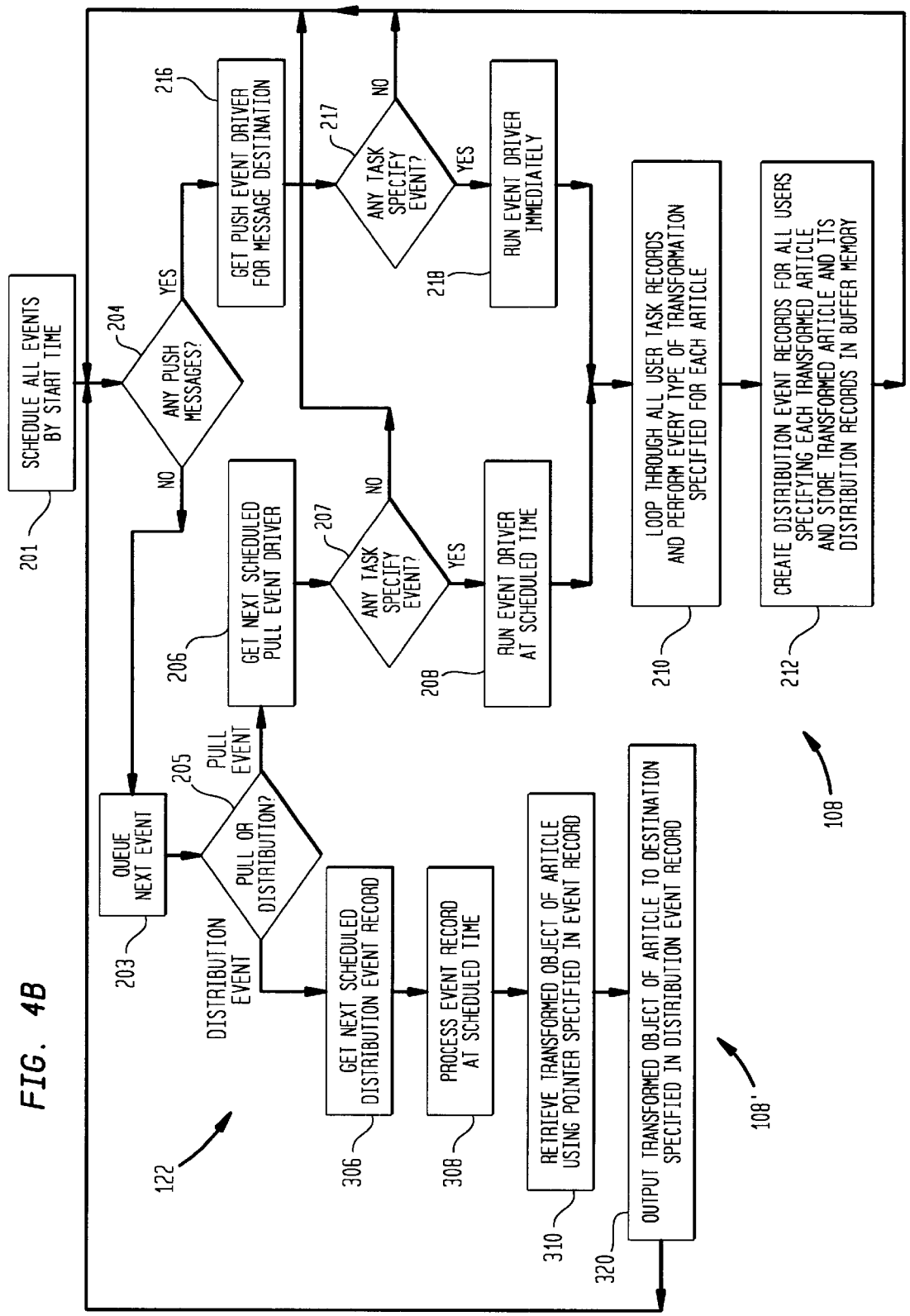
FIG. 4B is a flow diagram of the combined event driver queue processor and distribution event queue processor, for the architecture of FIG. 4A.

FIG. 4B is a flow diagram of an alternate embodiment 108' of the combined event driver queue processor 108 of FIG. 2A and the distribution event queue processor 122 of FIG. 3A, for the architecture of FIG. 4A. The alternate embodiment 108' operates on queues composed of gathering event drivers 230 and 250 and distribution event records 330 and 330' organized in a queue order by their respective execution times. The flow diagram begins with step 210 to schedule all events by start time. Then step 204 determines if any push messages have been received. If yes, then the process flows to step 216 of the event driver queue processor 108 of FIG. 2A, to immediately run the push event driver. If step 204 returns a no, then the process flows to step 203 to queue the next event. Then step 205 determines if it is a pull event or a distribution event. If it is a pull event, then the process flows to step 206 of the event driver queue processor 108 of FIG. 2A, to get the next scheduled pull event driver. If step 205 returns a distribution event, then the process flows to step 306 of the distribution event queue processor 122 of FIG. 3A, to perform the distribution of the designated transformed article object to the designated destination specified in the distribution event record 182 of FIG. 2D. The distribution event queue processor 122 then loops back to step 204. The event driver queue processor 108 also loops back to step 204.

In this manner, the information distribution server distributes the articles and messages to destinations in the network at times and in forms that are specified by the user, while the information gathering server accesses and receives the articles and messages from the sources in the network at times and in forms that are independent of the user.

Various illustrative examples of the invention have been described in detail. In addition, however, many modifications and changes can be made to these examples without departing from the nature and spirit of the invention.

What is claimed is:

1. An information stream management network server, comprising:
    an information gathering server serving a plurality of users, the server having an input coupled to a network for simultaneously accessing articles from information pull sources in the network and for receiving articles from information push sources in the network in behalf of all users;
    at least one pull event driver in said information gathering server, having a specified pull event start time for accessing articles from a specified information pull source in the network;
    a supervisory input coupled to said information gathering server, for managing acquisition of all articles in behalf of all users and providing said specified pull event start time;
    at least one push event driver in said information gathering server, for receiving articles from said information push sources in the network addressed to a declarative address specified by a user;
    a user task record including parameters defined by the user's definition of transformations and distribution events for retrieved pull and push articles;
    an event driver queue processor performing customized transformations of the articles as summaries and compendiums;
    a storage coupled to said information gathering server, for storing said articles accessed by said pull event driver and said articles received by said push event driver; and
    an information distribution server coupled to said storage and to said network for downloading articles on behalf of all users, the distribution server having at east one user task record specified by said user, said record including a distribution start time specified by said user for retrieving said articles from said storage and a distribution format specified by said user for distributing said articles to a destination in the network said information distribution server distributing said articles to said destination in the network at times and in transformations that are specified by said user, while said information gathering server accesses and receives said articles from said sources in the network at times and in forms that are independent of said user.

2. The information stream management network server of claim 1, wherein said information gathering server further comprises:
    an event driver queue processor including a scheduler to schedule pull source event drivers by their respective said specified pull event start times;
    said event driver queue processor selecting a next scheduled pull event driver and running it at said specified pull event start time to access articles from a specified pull source;
    said event driver queue processor outputting said accessed articles from said specified information pull source to said storage.

3. The information stream management network server of claim 2, wherein said information gathering server further comprises:
    an information push input buffer for buffering any articles received from said information push sources;
    said event driver queue processor determining whether any articles have been received from said information push sources addressed to a declarative address, immediately selecting and running a push event driver in said information gathering server for such information push articles;
    said event driver queue processor providing said articles received from said information push sources to said destination in the network at times and in forms that are specified by said user.

4. The information stream management network server of claim 3, wherein said information distribution server further comprises:
    a distribution event queue processor including a scheduler to schedule distribution event records by their respective said distribution event start times;
    said distribution event queue processor selecting a next scheduled distribution event record and running it at said distribution event start time to retrieve said articles from said storage;
    said distribution event queue processor outputting said retrieved articles to a destination specified in said user task record using a format specified in said user task record.

5. The information stream management network server of claim 4, which further comprises:
said at least one push event driver including declarative address information for storing in said storage said received articles from said information push sources addressed to said declarative address; and
said distribution server retrieving from said storage said received articles from said information push sources addressed to said declarative address.

6. The information stream management network server of claim 1, wherein said at least one pull event driver further comprises:
information for storing in said storage said accessed articles from said specified information pull source.

7. The information stream management network server of claim 6, wherein said distribution server further comprises:
information for retrieving from said storage said accessed articles from said specified information pull source.

8. The information stream management network server of claim 1, wherein said at least one push event driver further comprises:
a declarative address information for storing in said storage said received articles from said information push sources addressed to said declarative address.

9. The information stream management network server of claim 8, wherein said distribution server further comprises:
said declarative address information for retrieving from said storage said received articles from said information push sources addressed to said declarative address.

10. The information stream management network server of claim 1, wherein said supervisory input further comprises:
a supervisory server for defining pull event drivers with pull event start times and loading thereof into said information gathering server;
said supervisory server defining push event drivers with declarative address information and loading thereof into said information gathering server.

11. The information stream management network server of claim 10, wherein said supervisory server further comprises:
said supervisory server providing information to said storage for storing said push and pull articles.

12. The information stream management network server of claim 11, wherein said supervisory server further comprises:
said supervisory server sending information to said information distribution server for enabling retrieval of push and pull articles from said storage.

13. The information stream management network server of claim 1, wherein said information gathering server further comprises:
an information push input buffer for buffering any articles received from said information push sources addressed to a specified declarative address;
an event driver queue processor for determining whether any articles have been received from said information push sources addressed to a specified declarative address, selecting and running a push event driver in said information gathering server for such information push articles;
said event driver queue processor outputting said articles received from said information push sources to said storage.

14. The information stream management network server of claim 1, wherein said information gathering server further comprises:
an event driver queue processor including a scheduler to schedule pull source event drivers by their respective pull event start times;
said event driver queue processor selecting a next scheduled pull event driver and running it at a scheduled time to access articles from a specified pull source;
said event driver queue processor outputting said accessed articles from said specified information pull source to said storage.

15. The information stream management network server of claim 1, wherein said information distribution server further comprises:
an event queue processor including a scheduler to schedule distribution event records by their respective distribution event start times;
said event queue processor selecting a next scheduled distribution event record and running it at a specified time to retrieve articles from said storage;
said event queue processor outputting said retrieved articles to a destination specified in said user task record using a format specified in said user task record.

16. The information stream management network server of claim 15, wherein said retrieved articles are modified comprising the step of:
producing a notification to the user of the retrieved articles.

17. The information stream management network server of claim 15, wherein said retrieved articles are modified comprising the step of:
producing a summary of the retrieved articles.

18. The information stream management network server of claim 15, wherein said retrieved articles are modified comprising the step of:
producing a translation of the retrieved articles.

19. The information stream management network server of claim 15, wherein said retrieved articles are modified comprising the step of:
producing a compendium of the retrieved articles.

20. The information stream management network server of claim 15, wherein said retrieved articles are modified comprising the step of:
producing a format conversion of the retrieved articles.

21. The information stream management network server of claim 1, further comprising:
said information distribution server having an output coupled to said network for distributing E-mail articles.

22. The information stream management network server of claim 1, further comprising:
said information distribution server having an output coupled to said network for distributing facsimile articles.

23. The information stream management network server of claim 1, further comprising:
said information distribution server having an output coupled to said network for distributing Internet articles.

24. The information stream management network server of claim 1, further comprising:
said information distribution server having an output coupled to said network for distributing text-to-voice converted articles over telephone voice links.

25. The information stream management network server of claim 1, further comprising:
said information distribution server having an output coupled to said network for distributing articles over digital wide area networks.

26. The information stream management network server of claim 1, further comprising:

said information distribution server having an output coupled to said network for distributing articles in image data format.

27. The information stream management network server of claim 1, further comprising:

said information distribution server having an output coupled to said network for distributing articles in a graphical format.

28. The information stream management network server of claim 1, further comprising:

said information gathering server having said input coupled to said network for accessing articles from news sources.

29. The information stream management network server of claim 1, further comprising:

said information gathering server having said input coupled to said network for accessing articles from proprietary databases.

30. The information stream management network server of claim 1, further comprising:

said information gathering server having said input coupled to said network for receiving E-mail articles.

31. The information stream management network server of claim 1, further comprising:

said information gathering server having said input coupled to said network for receiving reminder articles.

32. The information stream management network server of claim 1, further comprising:

said information gathering server having said input coupled to a public switched telephone network.

33. The information stream management network server of claim 1, further comprising:

said information gathering server receiving articles in a first form and converting them to a second form as specified in said user task record.

34. The information stream management network server of claim 1, further comprising:

said information gathering server receiving articles in a first multimedia format and converting them to a second multimedia format as specified in said user task record.

35. The information stream management network server of claim 1, further comprising:

said information gathering server having said input coupled to an Internet network.

36. An information stream management network server, comprising:

an information gathering server serving a plurality of users, the gathering server having an input coupled to a network for simultaneously accessing articles from information pull sources in the network in behalf of all users according to a server determined schedule;

at least one pull event driver in said information gathering server, having a specified pull event start time for accessing articles from a specified information pull source in the network;

a supervisory input coupled to said information gathering server, for providing said specified pull event start time;

a user task record including parameters defined by the user's definition of transformations and distribution events for retrieved pull articles;

an event driver queue processor performing customized transformations of the articles as summaries and compendiums;

a storage coupled to said information gathering server, for storing said articles accessed by said pull event driver; and an information distribution server coupled to said storage and to said network downloading articles in behalf of all users, the distribution server having at least one user task record specified by said user, said record including a distribution start time specified by said user for retrieving said articles from said storage and a distribution format specified by said user for distributing said articles to a destination in the network specified by said user;

said information distribution server distributing said articles to said destination in the network at times and in transformations that are specified by said user, while said information gathering server accesses said articles from said sources in the network at times and in forms that are independent of said user.

37. The information stream management network server of claim 36, wherein said information gathering server further comprises:

an event driver queue processor including a scheduler to schedule pull source event drivers by their respective said specified pull event start times;

said event driver queue processor selecting a next scheduled pull event driver and running it at said specified pull event start time to access articles from a specified pull source;

said event driver queue processor outputting said accessed articles from said specified information pull source to said storage.

38. The information stream management network server of claim 37, wherein said information distribution server further comprises:

a distribution event queue processor including a scheduler to schedule distribution event records by their respective said distribution event start times;

said information gathering server selectively modifying said retrieved articles as specified in said user task record, forming objects which are stored in said storage;

said distribution event queue processor selecting a next scheduled distribution event record and running it at said distribution event start time to retrieve said objects from said storage;

said distribution event queue processor outputting said objects to a destination specified in said user task record using a format specified in said user task record.

39. The information stream management network server of claim 38, wherein said information gathering server further comprises:

an information push input buffer for buffering any articles received from information push sources in the network;

said event driver queue processor determining whether any articles have been received from said information push sources addressed to a declarative address, immediately selecting and running a push event driver in said information gathering server for such information push articles;

said event driver queue processor outputting said articles received from said information push sources to said storage.

40. The information stream management network server of claim 39, which further comprises:

said at least one push event driver including declarative address information for storing in said storage said received articles from said information push sources addressed to said declarative address; and said storage including said declarative address information for retrieving from said storage said received articles from said information push sources addressed to said declarative address.

41. A process for an information stream management network service, comprising the steps of:

a user task record including parameters defined by the user's definition of transformations and distribution events for retrieved pull articles;

scheduling each of a plurality of information pull event drivers in an information gathering server in a network, according to respective pull event start times defined by a supervisor for managing and controlling acquisition of all articles on behalf of all users;

an event driver queue processor performing customized transformations of the articles as summaries, compendiums;

simultaneously accessing articles from a plurality of information pull sources in the network using said pull event drivers at said respective pull event start times and storing said accessed articles in a storage, the sources being specified for respective ones of said drivers;

scheduling each of a plurality of information distribution event records in an information distribution server in the network, according to respective distribution event start times defined by the user; and retrieving a subset of said articles from said storage on behalf of all users for distribution to a destination in the network using a respective one of said information distribution event records at said respective distribution event start time and sending said subset of articles to said destination in a transformation which is specified by said user in the user task record;

whereby said articles can be distributed to said destination at times and in forms that are customized by said user, while said accessing of said articles from said sources can remain independent of the user.

42. The process of claim 41, which further comprises:

receiving information push articles directed to declarative addresses, said articles having been sent from a plurality of information push sources in the network, and storing said articles in said storage using push event drivers, said declarative addresses being specified for respective ones of said push event drivers; and retrieving a subset of said articles from said storage for distribution to a second destination in the network using a respective second one of said information distribution event records at a respective second distribution event start time and sending said subset of articles to said second destination in a form which is specified by said user.

43. An information stream management network server, comprising:

a multiple event queue server having an input coupled to a network for accessing articles from information pull sources in the network on behalf of a plurality of users;

a user task record including parameters defined by the user's definition of transformations and distribution events for retrieved pull and push articles;

at least one pull event driver in said server, having a specified driver execution time for accessing articles from a specified information pull source in the network;

an event driver queue processor performing customized transformations of the articles as summaries and compendiums;

a supervisory input coupled to said server, for managing acquisition of all articles on behalf of all users and providing said specified driver execution time;

a storage coupled to said server, for storing said articles accessed by said pull event driver; and said multiple event queue server coupled to said storage and to said network, having at least one user task record specified by said user, said record including a distribution execution time specified by said user for retrieving said articles from said storage and a distribution format specified by said user for distributing said articles to a destination in the network specified by said user in the user task record;

said multiple event queue server distributing said articles to said destination in the network at times and in transformations that are specified by said user in the user task record, while said server accesses said articles from said sources in the network at times and in forms that are independent of said user.

44. The information stream management network server of claim 43, wherein said multiple event queue server further comprises:

an event queue processor including a scheduler to schedule events by their respective execution times;

said event queue processor selecting a next scheduled event and running it at said specified execution time to process the scheduled event;

said events including command events, driver execution events, information creation events, and information distribution events.

45. The information stream management network server of claim 44, wherein said multiple event queue server further comprises:

said server selectively modifying said retrieved articles as specified in said user task record, forming objects which are stored in said storage;

said event queue processor selecting a next scheduled driver execution event record and running it at said execution time to retrieve said objects from said storage;

said event queue processor outputting said objects to a destination specified in said user task record using a format specified in said user task record.

46. The information stream management network server of claim 45, wherein said multiple event queue server further comprises:

an information push input buffer for buffering any articles received from information push sources in the network;

said event queue processor determining whether any articles have been received from said information push sources addressed to a declarative address, immediately selecting and running a push event driver server for such information push articles;

said event queue processor outputting said articles received from said information push sources to said storage.

47. The information stream management network server of claim 46, which further comprises:

at least one push event driver including declarative address information for storing in said storage said received articles from said information push sources addressed to said declarative address; and said storage including said declarative address information for retrieving from said storage said received articles from said information push sources addressed to said declarative address.

48. A process for an information stream management network service, comprising the steps of:

a user task record including parameters defined by the user's definition of transformations and distribution events for retrieved pull articles;

scheduling each of a plurality of information pull gathering events in a server in a network on behalf of a plurality of users, according to respective driver execution times defined by a supervisor;

an event driver queue processor performing customized transformations of the articles as summaries and compendiums;

accessing articles from a plurality of information pull sources in the network on behalf of all users under direction of the supervisor at said respective driver execution times and storing said accessed articles in a storage, the sources being specified for respective ones of said gathering events;

an event driver queue processor performing customized transformations of the articles as summaries and compendiums;

scheduling each of a plurality of information distribution events in the server according to respective distribution execution times defined by a user; and retrieving a subset of said articles from said storage on behalf of all users for distribution to a destination in the network at said respective distribution execution times and sending said subset of articles to said destination in a form which is specified by said user in the user task record;

whereby said articles can be distributed to said destination at times and in transformations that are customized by said user according to the user task record, while said accessing of said articles from said sources can remain independent of the user.

49. The process of claim 48, which further comprises:

receiving information push articles directed to declarative addresses, said articles having been sent from a plurality of information push sources in the network, and storing said articles in said storage using push event drivers, said declarative addresses being specified for respective ones of said push event drivers; and retrieving a subset of said articles from said storage for distribution to a second destination in the network at a respective second distribution execution time and sending said subset of articles to said second destination in a form which is specified by said user.

50. A process for an information stream management network service, comprising the steps of:

a user task record including parameters defined by the user's definition of transformations and distribution events for retrieved pull articles;

scheduling each of a plurality of information gathering events in a server in a network on behalf of a plurality of users, according to respective driver execution times defined by a supervisor;

an event driver queue processor performing customized transformations of the articles as summaries and compendiums;

simultaneously accessing articles from a plurality of information sources in the network at said respective driver execution times and transforming the articles into a form which is specified by a user;

scheduling each of a plurality of information distribution events in the server on behalf of all users according to respective distribution execution times defined by said user; and distributing a subset of said transformed articles to a destination in the network at said respective distribution execution times;

whereby said articles can be distributed to said destination at times and in forms that are customized by said user, while said accessing of said articles from said sources can remain independent of the user.

51. An information stream management network server, comprising:

a user task record including parameters defined by the user's definition of transformations and distribution events for retrieved pull articles;

scheduling means for scheduling each of a plurality of information gathering events in a server in a network on behalf of a plurality of users according to respective driver execution times defined by a supervisor;

an event driver queue processor performing customized transformations of the articles as summaries and compendiums;

simultaneously accessing means for accessing articles from a plurality of information sources in the network under the direction of the supervisor at said respective driver execution times;

transforming means for transforming the articles into a form which is specified by a user;

said scheduling means scheduling each of a plurality of information distribution events in the server on behalf of all users according to respective distribution execution times defined by said user; and distributing means for distributing a subset of said transformed articles to a destination in the network at said respective distribution execution times;

whereby said articles can be distributed to said destination at times and in forms that are customized by said user, while said accessing of said articles from said sources can remain independent of the user.

52. An information stream management network server, comprising:

a user task record including parameters defined by the user's definition of transformations and distribution events for retrieved pull articles;

an information gathering server having an input coupled to a network for accessing articles from information pull sources in the network on behalf of a plurality of users; an event driver queue processor performing customized transformations of the articles as summaries and compendiums;

at least one pull event driver in said information gathering server, having a specified pull event start time for accessing articles from a specified information pull source in the network;

a storage coupled to said information gathering server, for storing said articles accessed by said pull event driver; and an information distribution server coupled to said storage and to said network for downloading articles on behalf of all users, the distribution server having a plurality of task records respectively specified by said plurality of users, said records including respective distribution start times specified by said plurality of users for respectively retrieving said articles from said storage and respective distribution formats specified by said plurality of users for distributing said articles to respective destinations in the network specified by said plurality of users;

said information distribution server distributing said articles to said destinations in the network at times and in forms that are specified by said users, while said information gathering server accesses said articles from said sources in the network on behalf of all of the plurality of users at times and in forms that are independent of said users.

53. A process for information stream management network service, comprising:

a user task record including parameters defined by the user's definition of transformations and distribution events for retrieved pull articles;

scheduling at least one pull event driver in an information gathering server on behalf of a plurality of users, the gathering server having a specified pull event start time for accessing articles from a specified information pull source in the network and storing them in a storage;

an event driver queue processor performing customized transformations of the articles as summaries and compendiums;

scheduling a plurality of task records respectively specified by a plurality of users, in an information distribution server, said records including respective distribution start times specified by said plurality of users for respectively retrieving said articles from said storage and said records including respective distribution formats specified by said plurality of users for distributing said articles to respective destinations in the network specified by said plurality of users; and distributing said articles to said destinations in the network on behalf of all users at times and in forms that are specified by said users, while said information gathering server accesses said articles from said sources in the network on behalf of all of the plurality of users at times and in forms that are independent of said users.

\* \* \* \* \*